(12) United States Patent
Halford

(10) Patent No.: US 7,610,790 B2
(45) Date of Patent: Nov. 3, 2009

(54) TOOLING SYSTEM

(75) Inventor: Ben John Halford, Leicestershire (GB)

(73) Assignee: Surface Generation Ltd. (GB)

( * ) Notice: Subject to any disclaimer, the term of this patent is extended or adjusted under 35 U.S.C. 154(b) by 542 days.

(21) Appl. No.: 10/596,799

(22) PCT Filed: Dec. 23, 2004

(86) PCT No.: PCT/GB2004/005402

§ 371 (c)(1),
(2), (4) Date: Jun. 23, 2006

(87) PCT Pub. No.: WO2005/061147

PCT Pub. Date: Jul. 7, 2005

(65) Prior Publication Data

US 2008/0016938 A1   Jan. 24, 2008

(30) Foreign Application Priority Data

Dec. 24, 2003 (GB) ................ 0329980.7
Jun. 16, 2004 (GB) ................ 0413387.2

(51) Int. Cl.
*B21D 37/02* (2006.01)
(52) U.S. Cl. .............. 72/413; 72/446; 72/462; 72/473; 72/478
(58) Field of Classification Search ........ 72/420, 72/421, 428, 441, 444, 446, 447, 462, 465.1, 72/413, 473, 478, 481.1, 481.9; 269/266
See application file for complete search history.

(56) References Cited

U.S. PATENT DOCUMENTS

| 1,528,993 | A | * | 3/1925 | Samuel Emil A | ............ 451/276 |
| 3,834,087 | A | * | 9/1974 | Dunn | ........................ 451/401 |
| 4,027,868 | A | * | 6/1977 | Jolly | ........................ 269/266 |
| 4,187,751 | A | * | 2/1980 | Barnacle | ...................... 83/458 |
| 4,752,063 | A | * | 6/1988 | Nagy | ........................ 269/266 |
| 5,407,185 | A |   | 4/1995 | Zehnpfennig et al. | |
| 5,746,423 | A | * | 5/1998 | Arov | ........................ 269/266 |
| 5,988,618 | A | * | 11/1999 | Meintrup et al. | ............ 269/266 |
| 6,554,265 | B2 | * | 4/2003 | Andronica | ................... 269/268 |

(Continued)

FOREIGN PATENT DOCUMENTS

EP     0 857 544 A    8/1998

(Continued)

OTHER PUBLICATIONS

International Search Report mailed Jun. 20, 2005, in corresponding International Application No. PCT/GB2004/005402.

(Continued)

*Primary Examiner*—Edward Tolan
(74) *Attorney, Agent, or Firm*—Young Law Firm, P.C.

(57) ABSTRACT

A tooling system comprises a plurality of elements (24) arranged in an array, the elements of the array being movable between a closed position in which the elements contact one another and are secured in position, and an open position in which the elements of the array are spaced apart and are capable of vertical movement relative to one another. The tooling system further comprises bolster means (34, 36) provided to hold the elements of the array securely in the closed position.

16 Claims, 13 Drawing Sheets

U.S. PATENT DOCUMENTS

| | | | |
|---|---|---|---|
| 6,578,399 B1 * | 6/2003 | Haas et al. | 72/57 |
| 7,125,010 B2 * | 10/2006 | Moore et al. | 269/266 |
| 2004/0145105 A1 * | 7/2004 | Halford | 269/266 |

FOREIGN PATENT DOCUMENTS

| | | |
|---|---|---|
| EP | 1 508 404 A | 2/2005 |
| WO | WO 02/064308 A | 8/2002 |

OTHER PUBLICATIONS

Search Report dated Mar. 5, 2004, in corresponding Application No. GB 0329980.7.

* cited by examiner

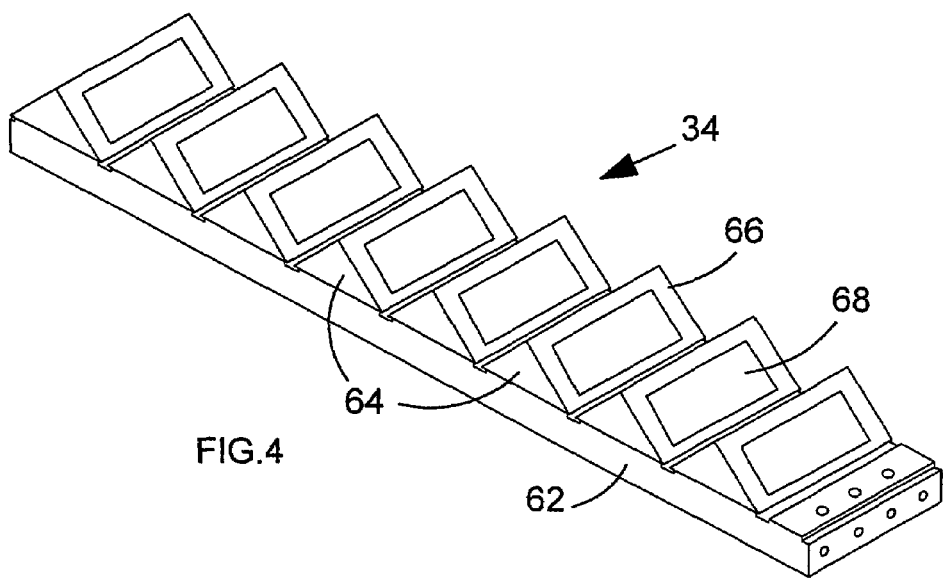
FIG.4
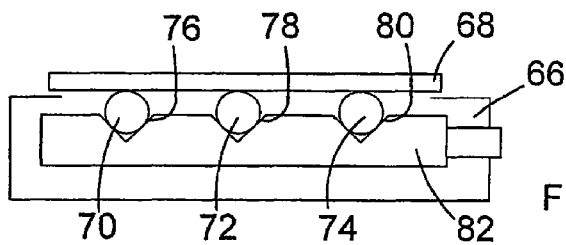
FIG.5a
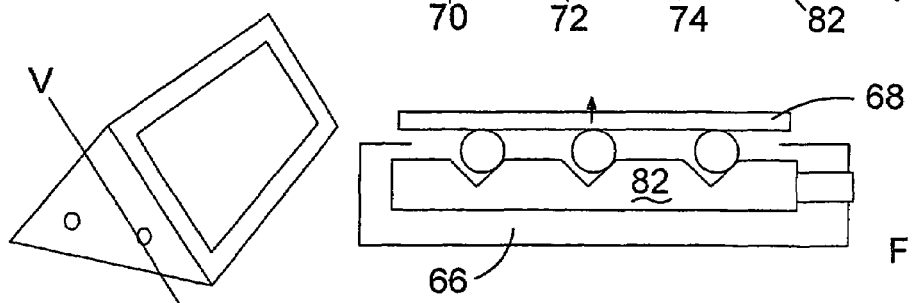
FIG.5b
FIG.5
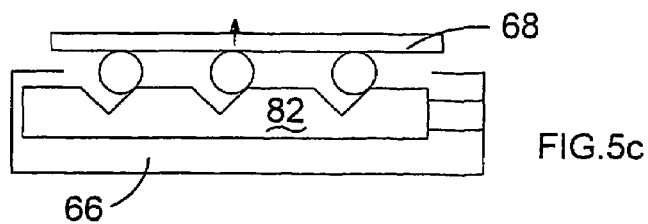
FIG.5c

TOOLING SYSTEM

The present invention relates to an improved component for use in a tooling system, and to an improved tooling system including this component.

The improved component is particularly suitable for use in the tooling systems described and claimed in International Patent Application No. WO 02/064308.

International Patent Application No. WO 02/064308 describes and claims a tooling system comprising a plurality of elements arranged in an array, each element being moveable longitudinally relative to the other elements in the array and having a first end, the system further comprising means to adjust the relative longitudinal positions of the elements such that the free ends of the elements define approximately a desired surface contour and means for retaining the elements in their adjusted positions, characterised in that: the first end of each element is provided on a machinable portion removably mounted to a base portion, the arrangement being such that the free ends of the elements can be machined to produce the desired surface contour.

International Patent Application No. WO 02/064308 further describes and claims a tooling system comprising a plurality of elements arranged in an array, the elements of the array being movable between a closed position in which the elements contact one another and are secured in position, and an open position in which the elements of the array are spaced a part and are capable of vertical movement relative to one another, and drive means for opening and closing the array. The elements are mounted on support rails to form the array.

It is an object of the present invention to provide a device for retaining the elements of an array of this type relative to one another, in order to provide an improved surface contour.

The present invention provides a tooling system which comprises a plurality of elements arranged in an array, the elements of the array being movable between a closed position in which the elements contact one another and are secured in position, and an open position in which the elements of the array are spaced apart and are capable of vertical movement relative to one another, characterised in that the tooling system further comprises bolster means provided to align the elements during closing of the array and to hold the elements of the array securely in the closed and aligned position.

In a preferred embodiment of the tooling system according to the invention, the bolster means has an element contacting face which is adapted selectively to apply localised pressure to one or more elements of the array.

The pressure may for example be applied mechanically, hydraulically or pneumatically.

The elements of the array are preferably substantially polygonal, for example triangular, rectangular or pentagonal, in cross-section and are preferably arranged so that, in the closed position of the array, the major axes of adjacent elements are aligned and their vertices touch one another, so that the elements of the array tessellate.

In a preferred embodiment of the tooling system according to the invention, the array is substantially rectangular in plan view and bolster means are provided on the four sides of the rectangle, the bolster means on at least two adjacent sides of the rectangular array having element contacting faces which are adapted selectively to apply localised pressure to one or more elements of the array.

In an alternative preferred embodiment of the tooling system according to the invention, where the array elements are substantially rectangular in cross-section and are arranged so that, in the closed position of the array, the major axes of adjacent elements are aligned and their vertices touch one another, so that the elements of the array tessellate, the array is substantially diamond shaped in plan view so that the outer edges are straight. Bolster means are provided on the four sides of the diamond, comprising bolster elements with substantially planar element-contacting faces. This has the advantage that the bolsters are less complex and lighter in weight, and hence cheaper to manufacture.

In an alternative preferred embodiment of the tooling system according to the invention, the array in plan view has one or more curved sides. In particular, the array may be substantially circular or oval in plan view.

Where the array in plan view has one or more curved sides, the bolster means is preferably a flexible strap provided with tightening and securing means.

Further, where the array in plan view has one or more curved sides, at least some of the array elements arranged at the periphery of the array may have a side face or adjacent side faces adapted to conform to the profile adopted by the strap bolster when tightened, along at least part of the height or length of the element. The array elements with one or more adapted side faces are preferably not elements which are to be machined.

In a particularly preferred embodiment of the tooling system according to the invention, the array is substantially rectangular in plan view and bolster means having element contacting faces which are adapted selectively to apply localised pressure to one or more elements of the array are provided on all four sides of the rectangular array.

In such an arrangement, the outer edges of the rectangular array are serrated and the bolster means preferably has a correspondingly serrated face. In a preferred embodiment of the tooling system according to the invention, the face of the bolster means contacting the array is formed from a plurality of teeth, at least some of which teeth are adjustable in order selectively to apply localised pressure to one or more elements of the array, in line with the sides of the elements. The teeth are preferably also individually adjustable in height relative to one another.

The element contacting face is preferably formed with a smooth face, so that there is low friction between the element contacting face and the element, when pressure is applied parallel to the sides of the elements, to allow pressure from the perpendicular bolster teeth to align elements in that direction also.

Each side of the bolster means may be formed of two or more separate component sections, so that one or more component sections may be moved to allow opening and adjustment of apart of the array, while maintaining the remainder of the array secured in the closed position.

The component sections may be moveable simply by lifting the sections away from the elements of the array. Alternatively, the component sections may be mounted pivotally or slidably on a chassis of the tooling system, for pivoting or sliding into and out of engagement with the array elements.

In a preferred embodiment of the tooling system according to the invention, the bolster means may comprise two sets of bolsters, the first of which is used during machining of the elements of the tooling system and the second of which is used when the elements of the array have been machined and the system is being used as a mould. The use of two sets of bolsters provides advantages in both cost and weight saving, as the second set of bolsters is both simpler and lighter in weight than the first set.

The tooling system preferably further comprises means for securing the second set of bolster means in position around the array of elements, for example a pallet strap, which may be carbon fibre, steel or nylon.

In order to provide added strength and rigidity to the tooling system, the tooling system preferably comprises an array of tie bars, which tie bar function may be provided by the cross rails of the tooling system or by additional tie bars running between the threaded supports of the array elements and bolted through the bolsters or the chassis of the tooling system. Where the tie bars or cross rails are bolted through the bolsters, this has the advantage that the assembled array, held in position by the tied bolsters may be lifted as a unit and transferred to a different location as required.

Alternatively, one or more hoop straps may be provided, for threading between the threaded supports of the array elements.

The bolster means are preferably modular in design, so that individual bolster sides interlock with one another to form larger units.

In a particularly preferred embodiment of the tooling system according to the invention, the bolster means comprises four identical bolster components each of which is mounted on a cross rail of the array and guided by a guide rail with which it is in sliding engagement.

The tooling system preferably further comprises vibrating means, so that the bolster sides can be vibrated to assist in bedding down the elements of the array. Alternatively or additionally, means may be provided to vibrate the individual array elements or rows of array elements against the bolster to assist in alignment thereof.

The tooling system preferably further comprises sensors to detect and measure the forces applied to the elements of the array and/or to detect any movement.

The present invention further comprises a method of operating a tooling system which comprises a plurality of elements arranged in an array, the elements of the array being movable between a closed position in which the elements contact one another and are secured in position, and an open position in which the elements of the array are spaced apart and are capable of vertical movement relative to one another, which tooling system further comprises bolster means provided to align the elements during closing of the array and to hold the elements of the array securely in the closed and aligned position, characterised in that the method of operation includes the step of correcting any inter-row or inter-array element misalignment by separating the rows of array elements, aligning the first row of array elements relative to an element of the bolster, moving a target row comprising the adjacent row of array elements into alignment with the first row while vibrating the array elements in the target row and repeating this procedure with successive rows until all of the array elements are correctly aligned.

An embodiment of a tooling system according to the invention will now be described with reference to the accompanying drawings, in which FIG. 1 is a view of a machine layout;

FIG. 4 is a view of a bolster side;

FIG. 5 is a view of a part of the bolster of FIG. 4 and

Figure 6:
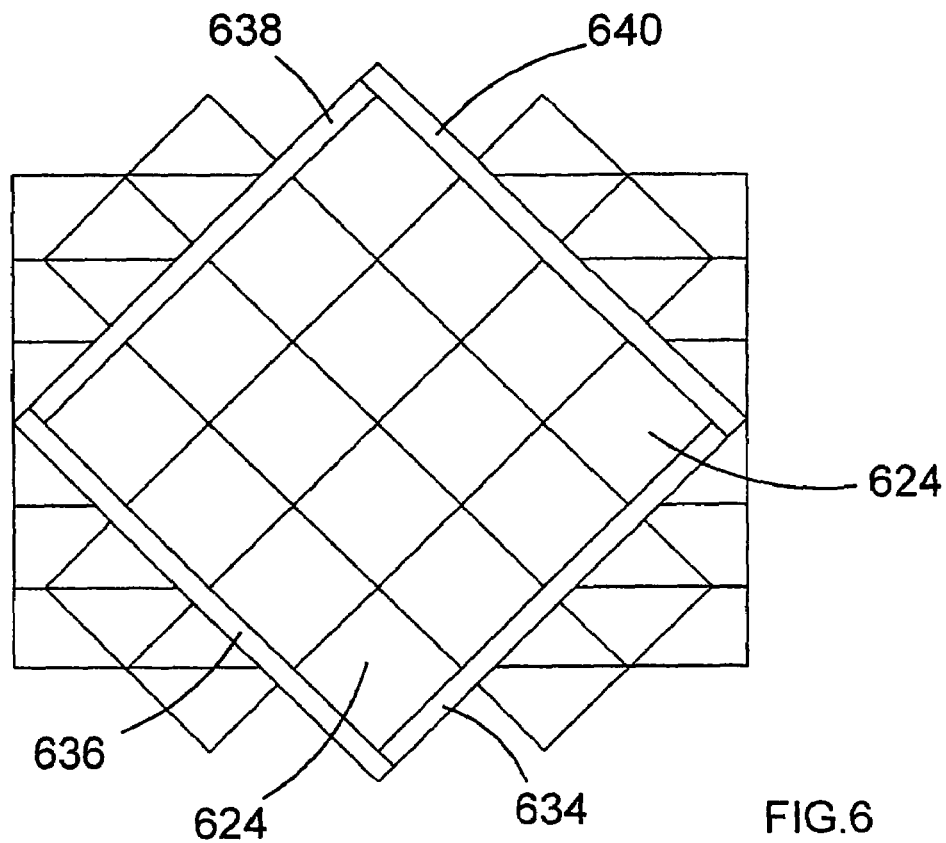
Figure 7:
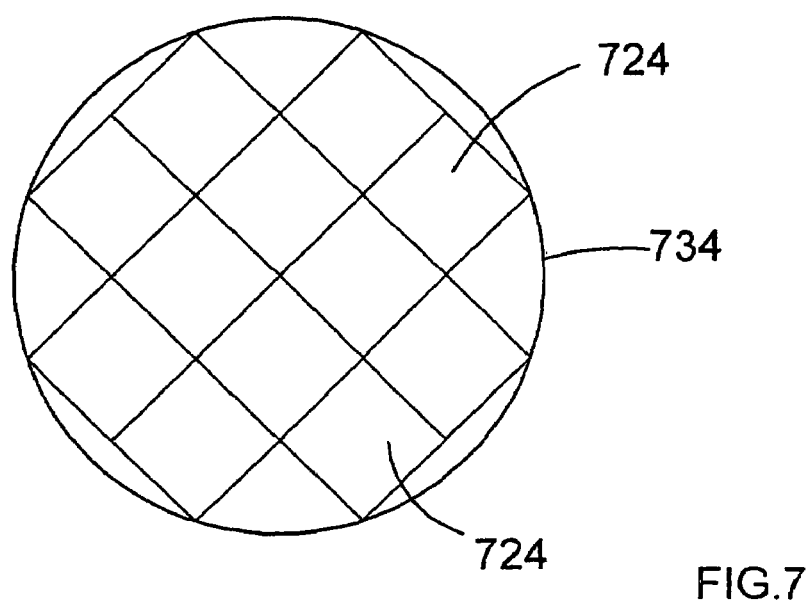
Figure 8:
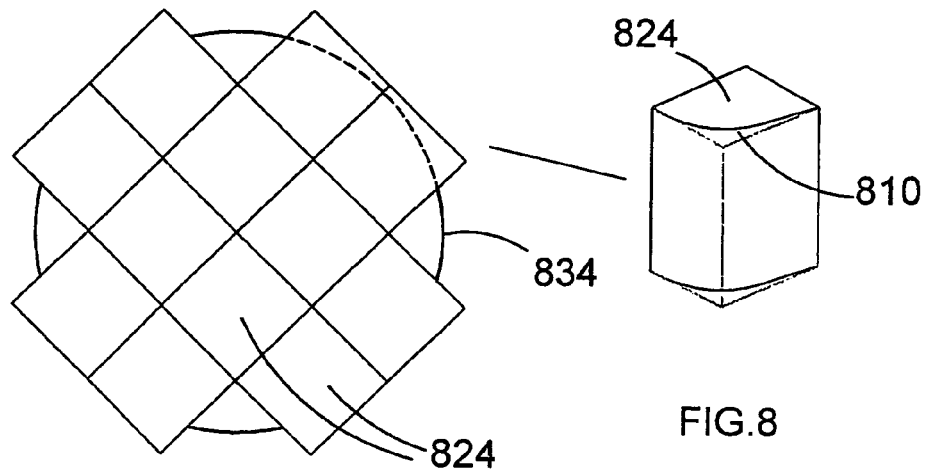
Figure 9:
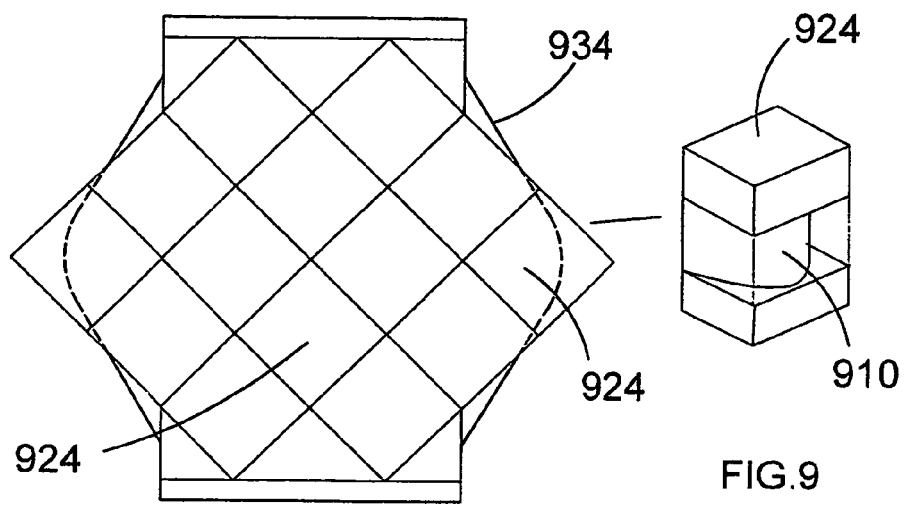
Figure 10:
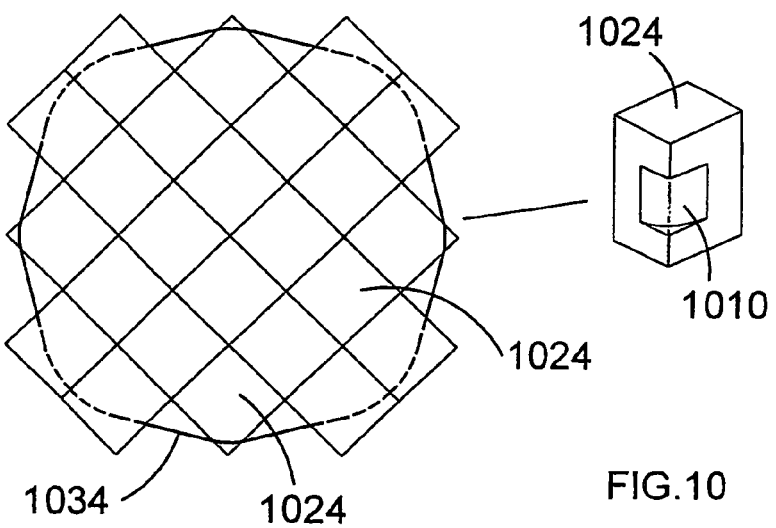
Figure 11:
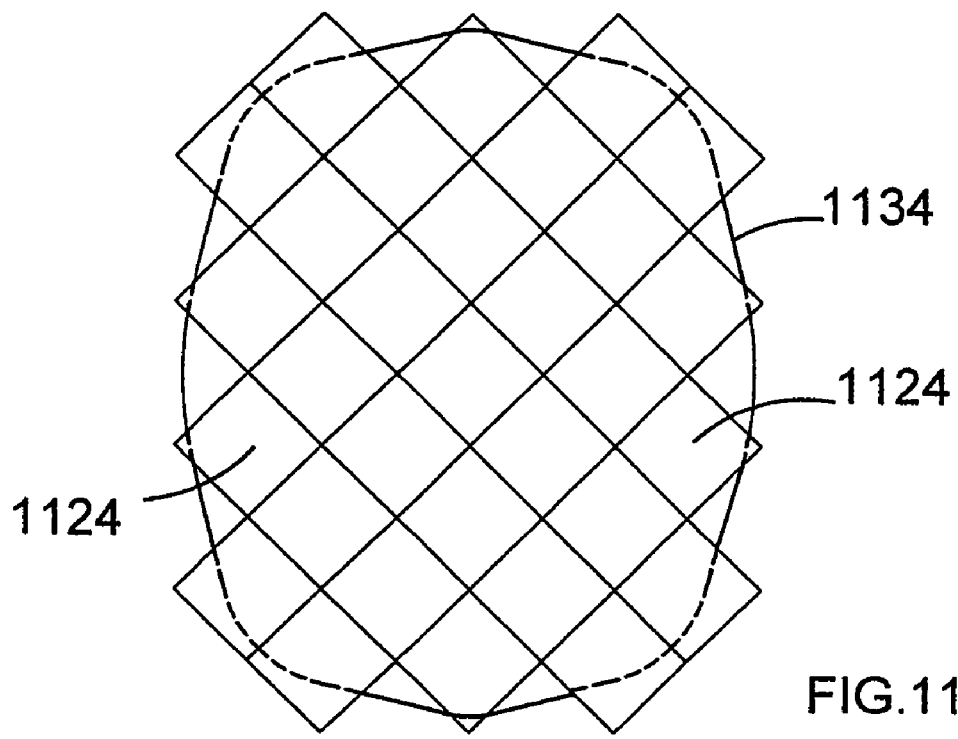
Figure 12:
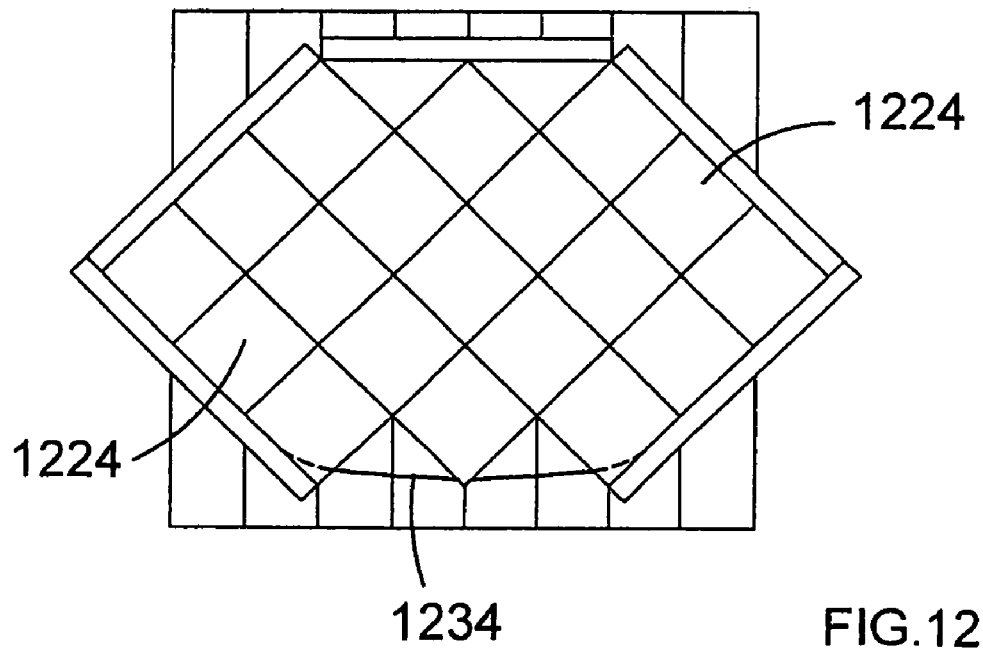
Figure 13:
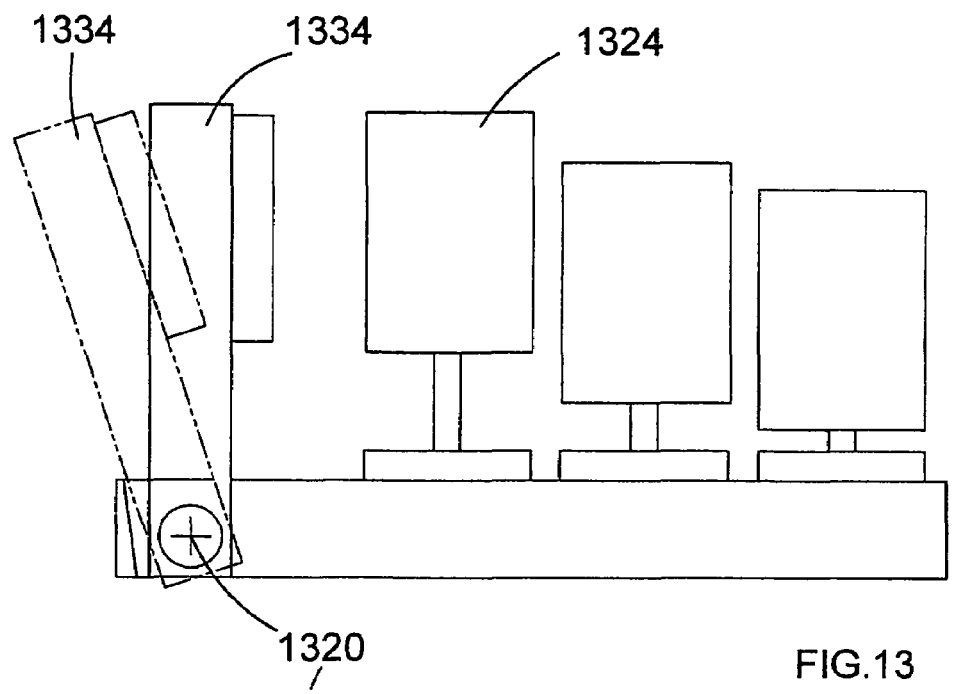
Figure 14:
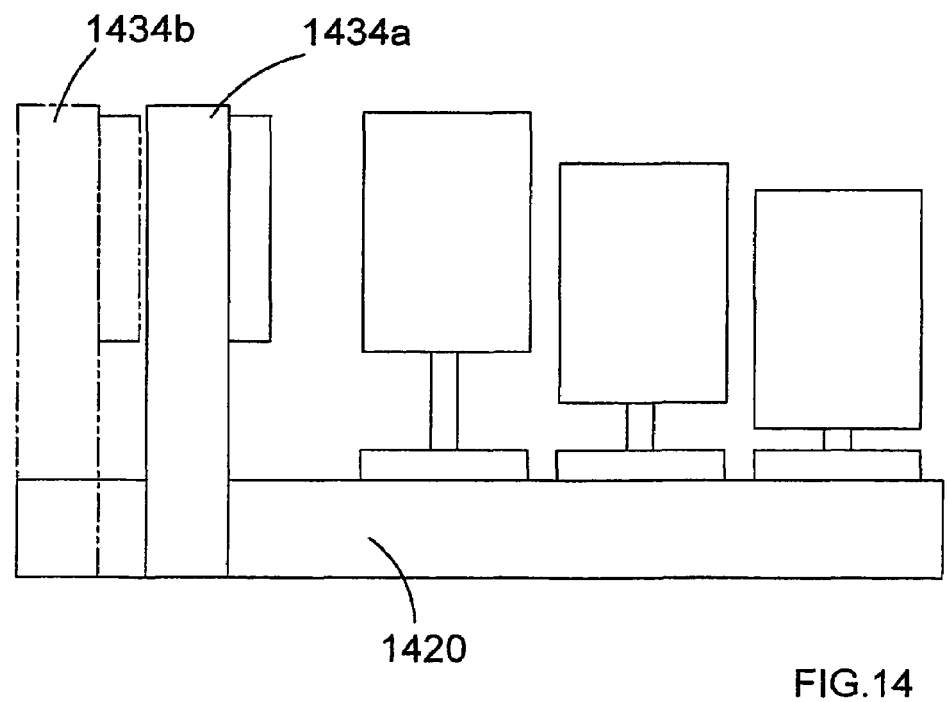
Figure 15:
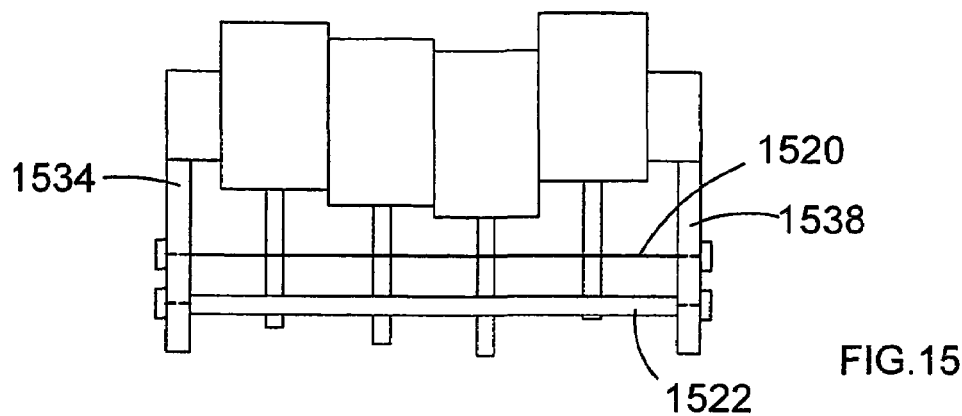
Figure 16:
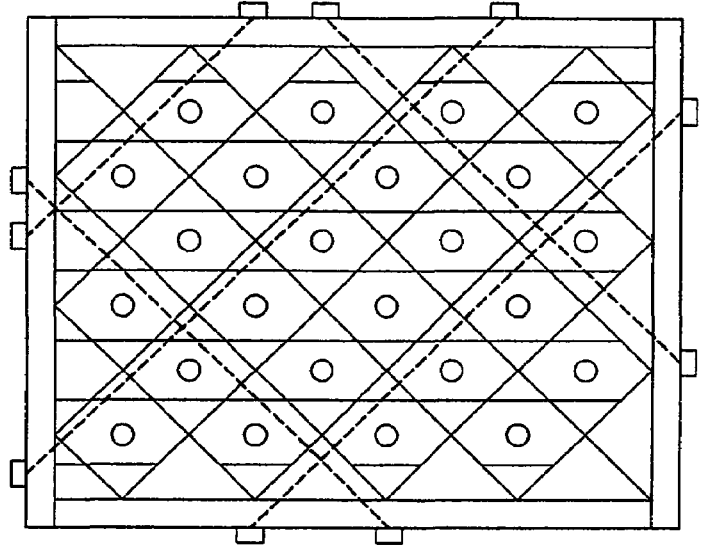
Figure 17:
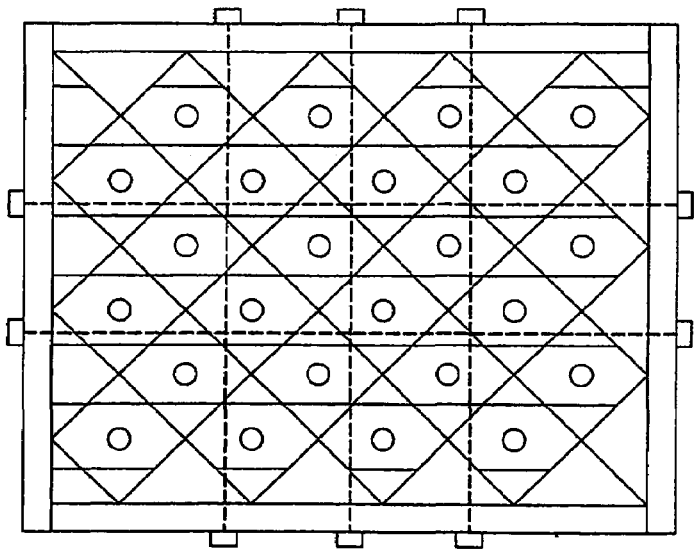
Figure 18:
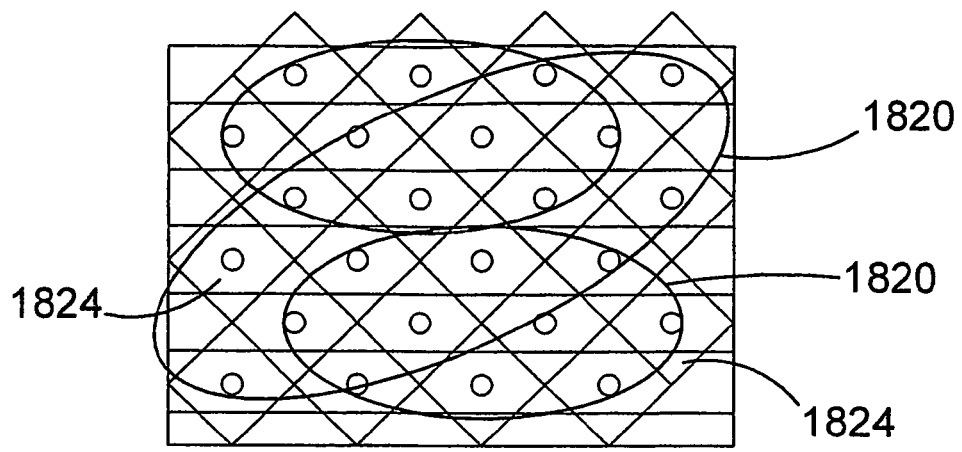
Figure 19:
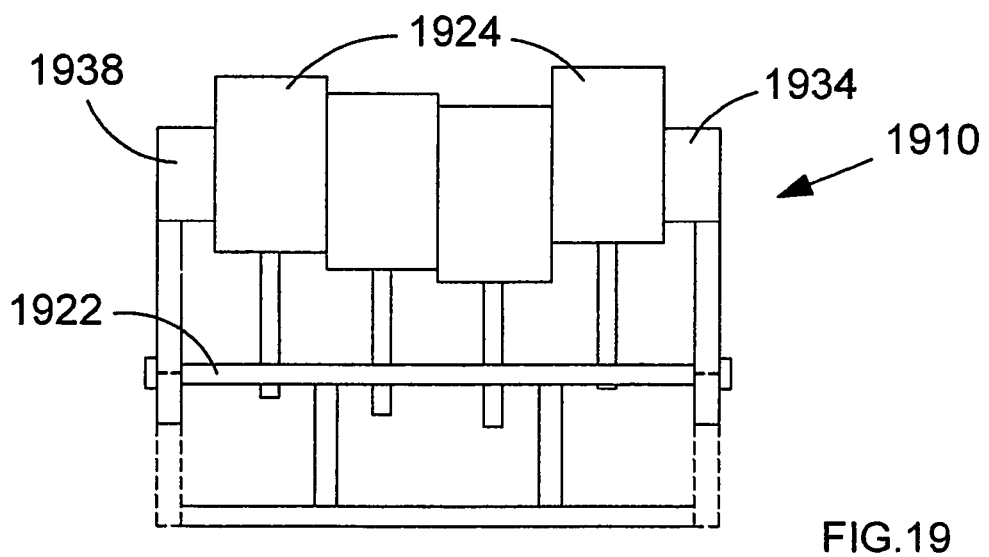
Figure 20:
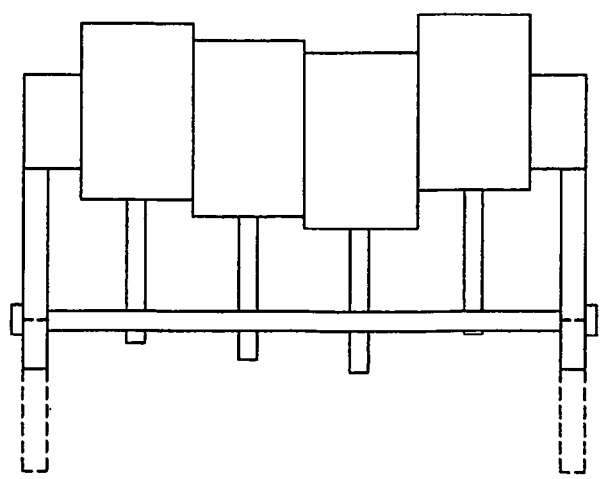
Figure 21A:
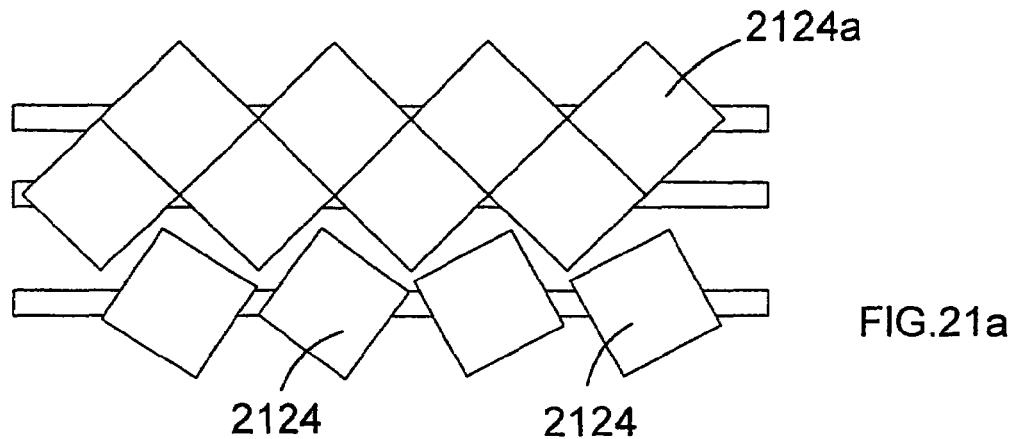
Figure 21B:
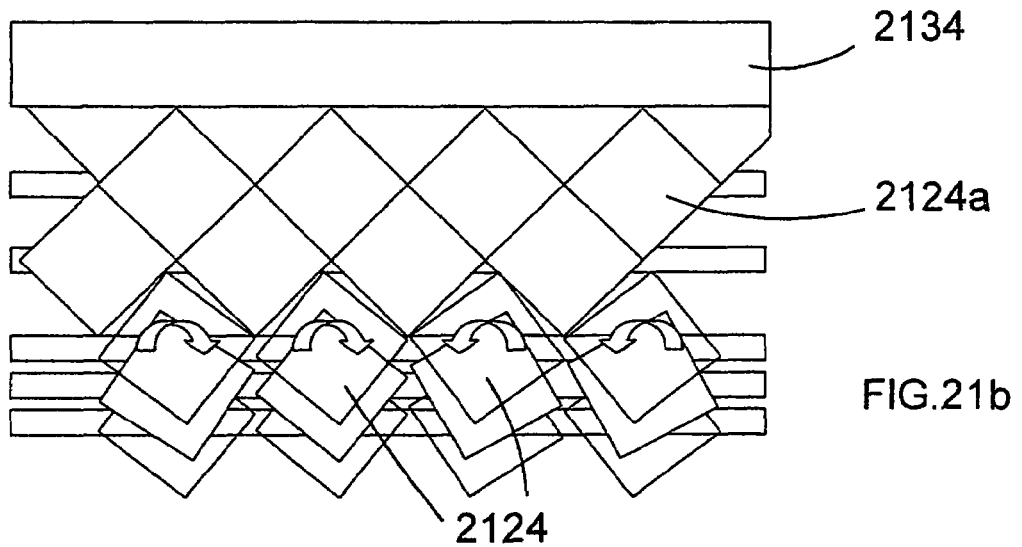
Figure 21C:
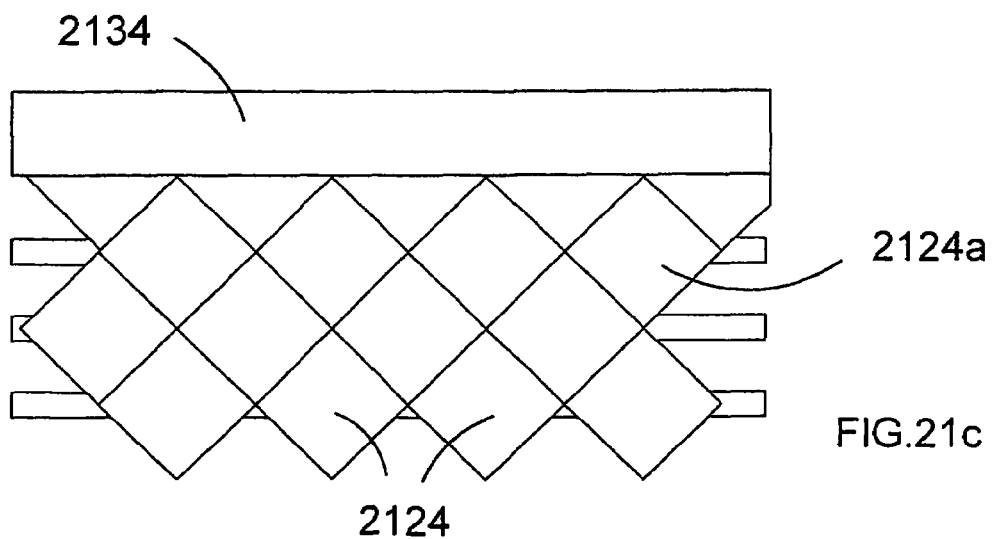
Figure 22:
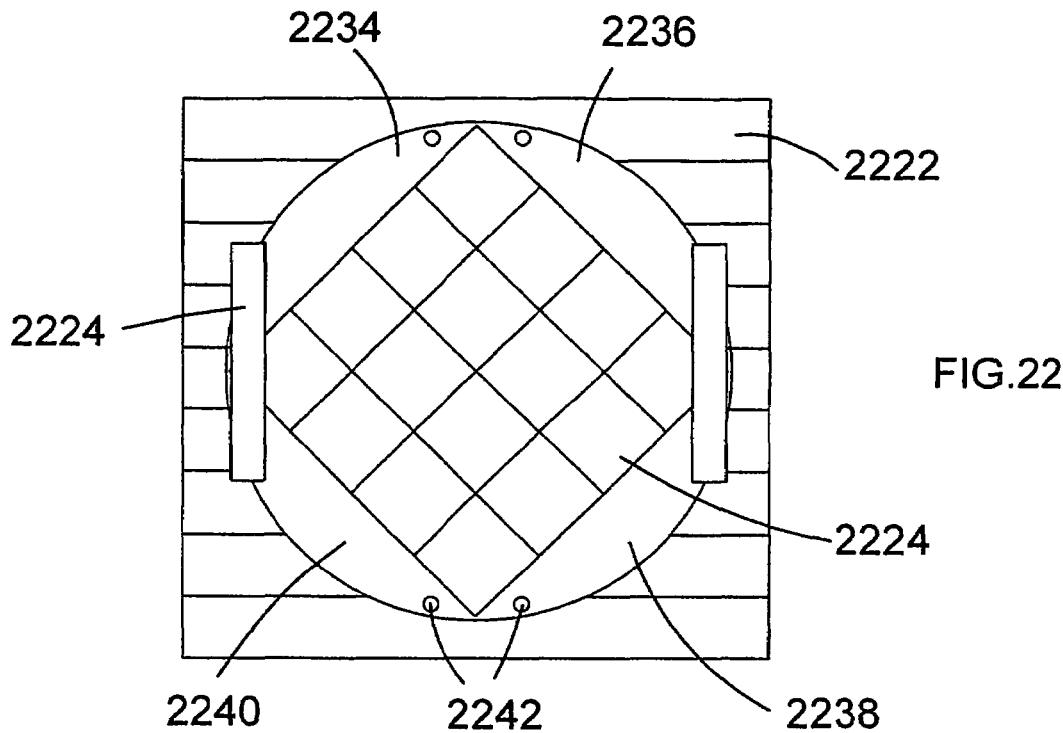
Figure 23:
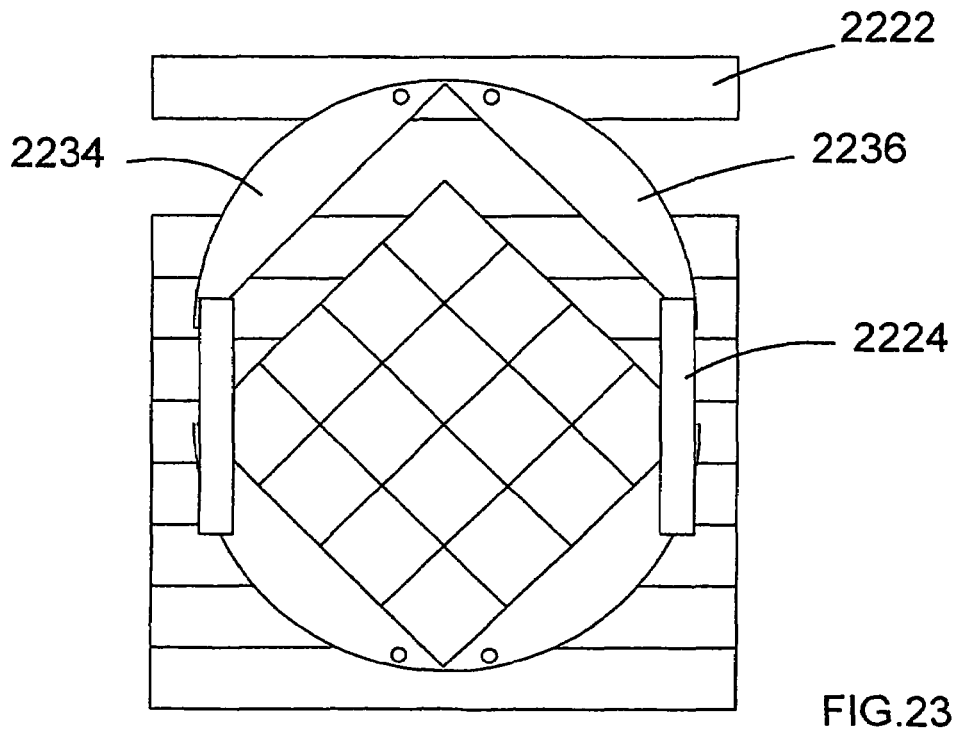
Figure 24:
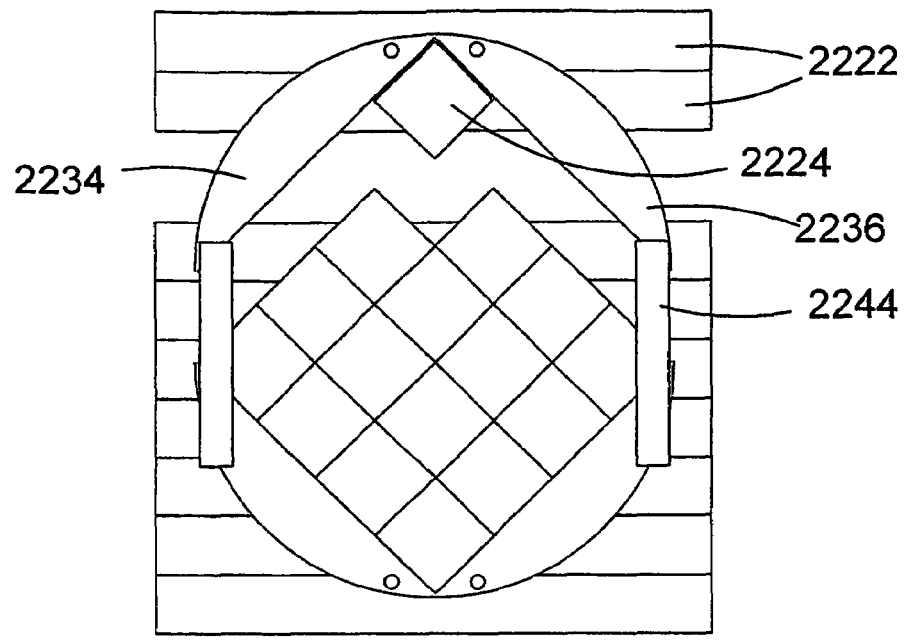
Figure 25:
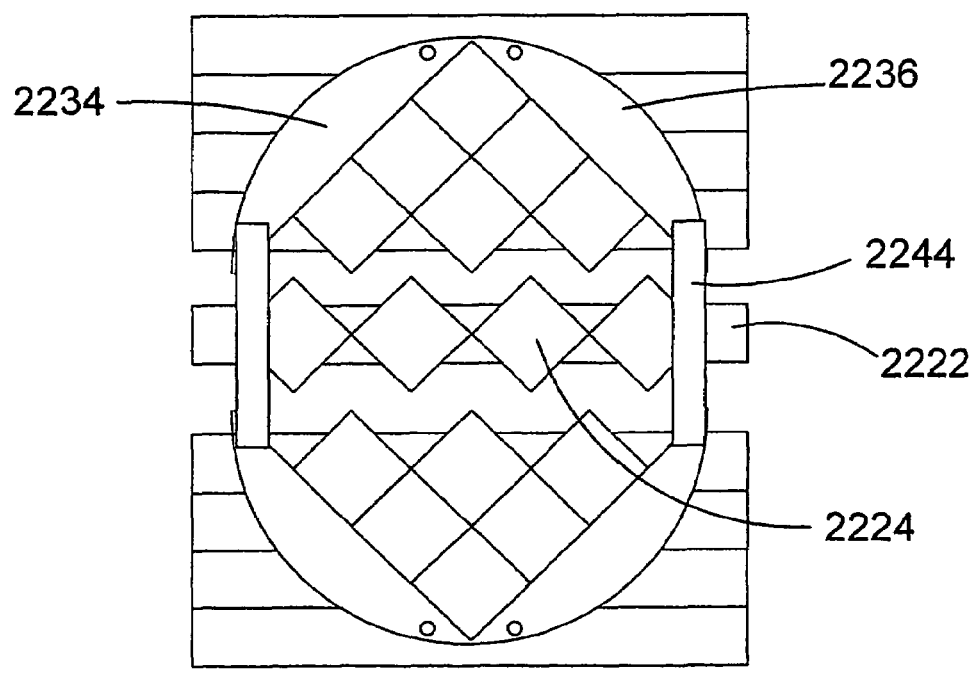
Figure 26:
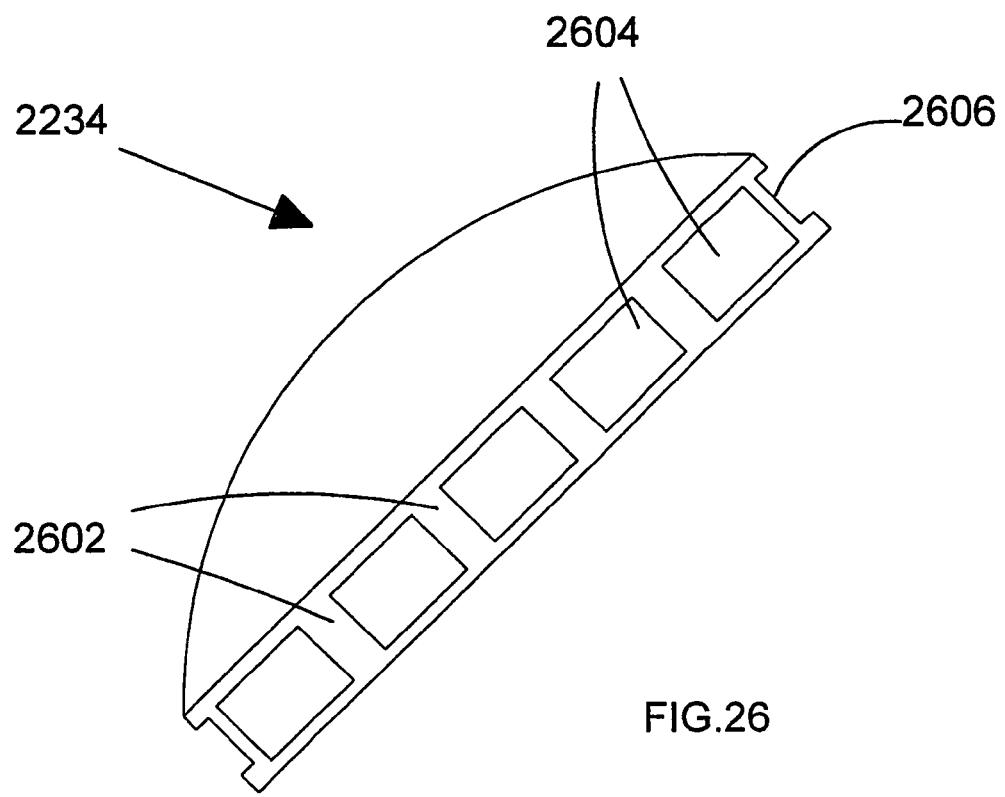

FIGS. 5(*a*); 5(*b*) and 5(*c*) are sections on the line V-V of the bolster part of FIG. 5;

FIG. 6 is a plan view of a second embodiment of an element array;

FIG. 7 is a plan view of a third embodiment of an element array;

FIG. 8 is a plan view of a fourth embodiment of an element array;

FIG. 9 is a plan view of a fifth embodiment of an element array;

FIG. 10 is a plan view of a sixth embodiment of an element array;

FIG. 11 is a plan view of a seventh embodiment of an element array;

FIG. 12 is a plan view of a eighth embodiment of an element array;

FIG. 13 is a partial side view of a first alternative embodiment of a tooling system;

FIG. 14 is a partial side view of a second alternative embodiment of a tooling system;

FIG. 15 is a side view of a tooling system provided with tie bars;

FIG. 16 is a plan view of a tooling system of FIG. 15;

FIG. 17 is a plan view of an alternative tooling system of FIG. 15;

FIG. 18 is a plan view of a tooling system provided with hoop straps;

FIG. 19 is a side view of a tooling system with a free standing bolster shown in position in the tooling system;

FIG. 20 is a side view of the free standing bolster of FIG. 19 removed from the tooling system FIGS. 21(*a*); FIG. 21(*b*) and FIG. 21(*c*) show steps in the procedure for the correction of misalignment of one or more array elements;

FIG. 22 is a plan view of a ninth embodiment of an element array, in a closed configuration;

FIG. 23 is a plan view of the embodiment of FIG. 22 in a first open configuration;

FIG. 24 is a plan view of the embodiment of FIG. 22 in a second open configuration;

FIG. 25 is a plan view of the embodiment of FIG. 22 in a third open configuration;

FIG. 26 is an isometric view of a bolster segment of FIG. 22 and

Figure 27:
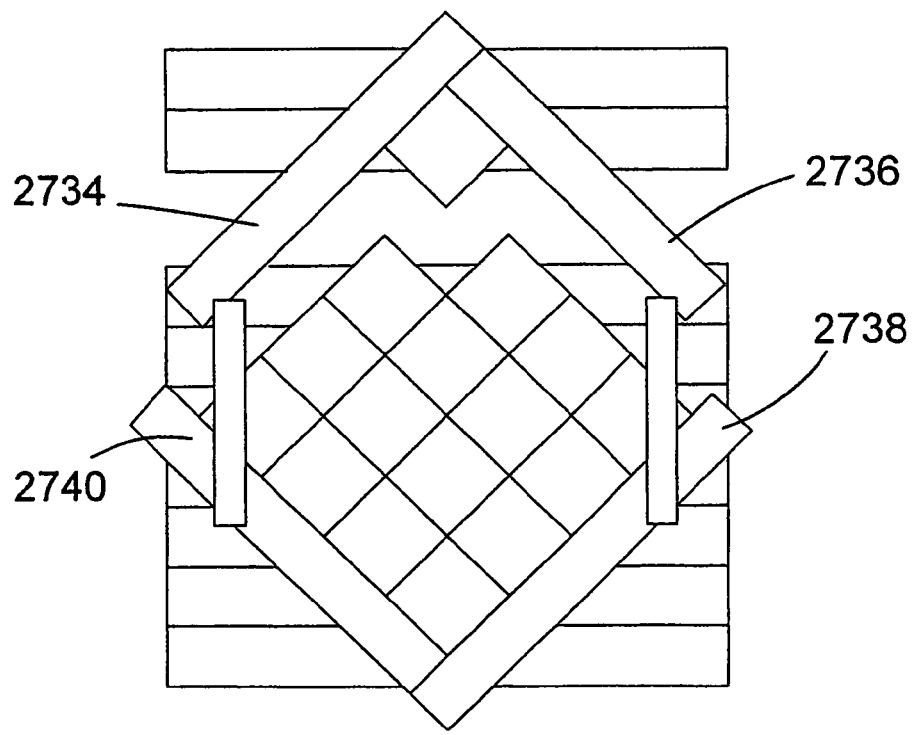

FIG. 27 is a plan view of a tenth embodiment of an element array, in an open configuration.

Figure 1:
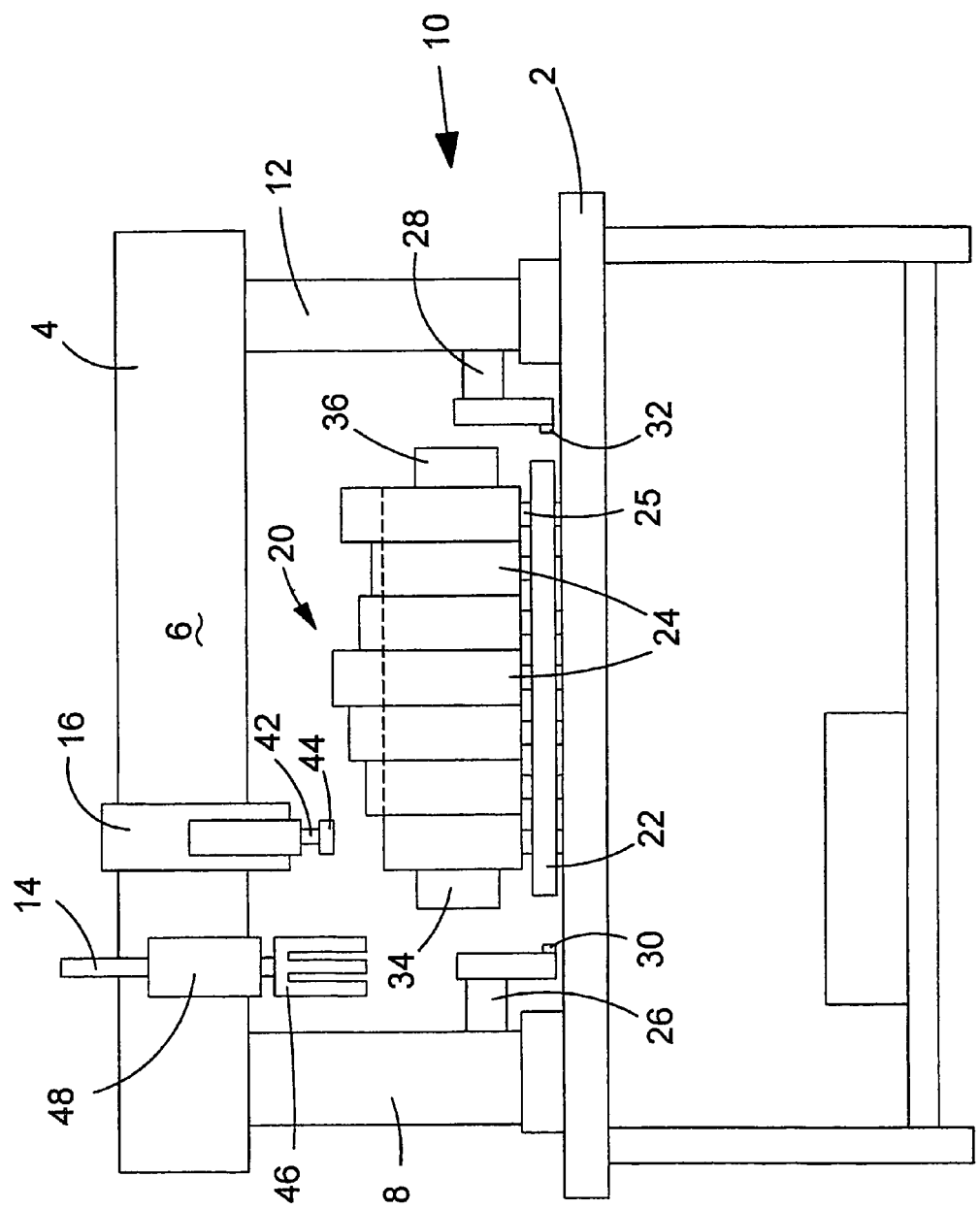

As can be seen from FIG. 1, a tooling system shown generally at 10 comprises a support table 2 on which is located a bridge 4, comprising a horizontal span 6 supported by first and second vertical supports 8, 12. The horizontal span 6 supports an adjustment mechanism 14 and a machining tool 16.

The system 10 further comprises a consumable module 20 comprising array elements 24 supported on cross rails 22, which are themselves supported on a chassis (not shown) on the support table 2.

Each of the elements 24 terminates in a threaded support post 25 which engages with an internally threaded aperture (not shown) in the cross rail 22.

First and second side arms 26, 28 extend from the first and second vertical supports 8, 12 respectively, and terminate in retractable pegs 30, 32 adapted to engage with recesses in the ends of the cross rails 22.

Figure 2:
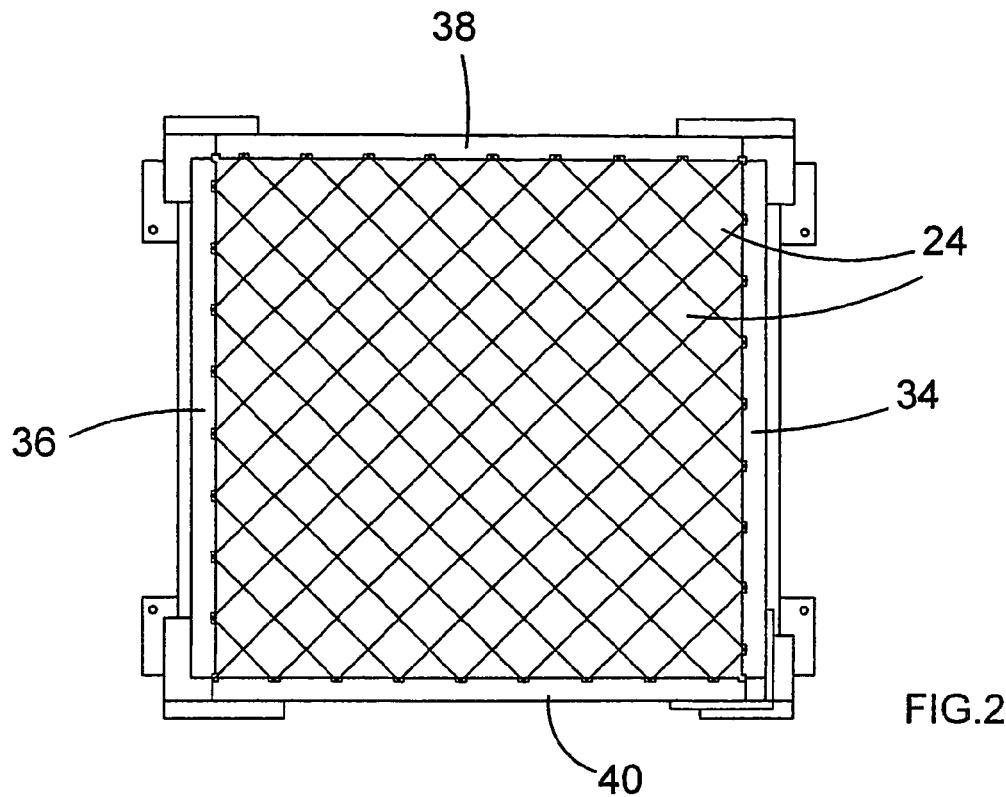
FIG. 2 is a plan view of a first embodiment of an element array.
Figure 3:
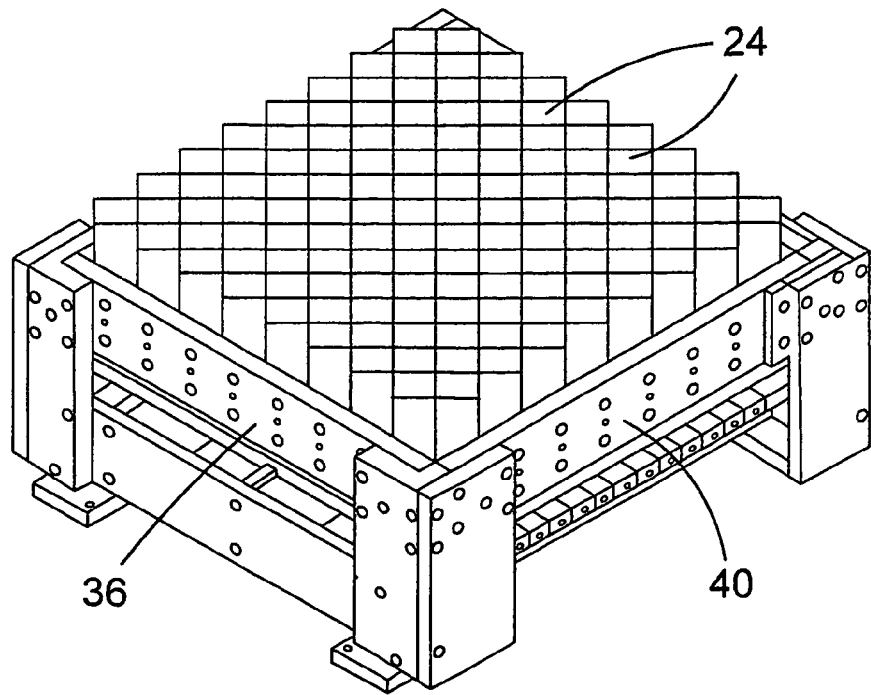
FIG. 3 is a perspective view of the element array of FIG. 2.

The elements 24 are arranged in an array, as shown in FIGS. 2 and 3 and are held in place by four bolsters 34, 36, 38 and 40. The elements 24 are orientated at −45° and +45°.

The machining tool shown generally at 16 comprises a spindle 42 and a tool head 44 mounted on the spindle 42.

The tool further comprises drive means (not shown) for locating and driving the tool head 44 via the spindle 42.

The adjusting mechanism shown generally at 14 comprises an adjustment fork 46 mounted on a pneumatic cylinder 48 and provided with a rotating drive (not shown).

The adjustment fork comprises a square head portion from which depend four tines, one tine depending from each of the four corners of the square head portion.

As can be seen from FIGS. 2, 3 and 4, the consumable module 20 comprises an array of elements 24 constrained by four bolster elements 34, 36, 38 and 40. Each of the bolster elements 34, 36, 38 and 40 comprises a back plate 62 on which are mounted an array of wedge shaped teeth 64 forming a serrated face.

As can be seen more clearly from FIG. 4, a bolster element shown generally at 34 includes an array of teeth 64. Each of the teeth 64 comprises a housing 66 on each of two faces of which is mounted a contact plate 68.

As can be seen more clearly from FIGS. 5(*a*); 5(*b*) and 5(*c*), which are sections through the tooth 64 on the line V-V of FIG. 5, showing different stages of the application of mechanical pressure, each of the contact plates 68 is supported by three rollers 70, 72 and 74 which extend across the length of the housing 66. The rollers are supported in V-shaped grooves 76, 78 and 80 formed in a support bar 82 which can be driven longitudinally along the length of the tooth 64. As the support bar 82 is driven along the tooth 64 in the direction of the arrows shown in FIGS. 5(*b*) and 5(*c*), the rollers 70, 72 and 74 rotate in the respective V-shaped grooves 76, 78 and 80 and are displaced relative to the longitudinal axis of the support bar 82. As the rollers 70, 72 and 74 rotate in the grooves 76, 78 and 80, the contact plate 68 is displaced and the pressure applied to the adjacent element is increased. As the support bar 82 is driven in the opposite direction, the applied pressure is reduced.

In use, the tooling system is assembled with the elements of the array in the closed and aligned position, using the bolster means to clamp the elements in the required positions. In order to clamp the array either before or after adjusting and machining the elements of the array as described in International Patent Application No. WO 02/064308, it is necessary first to ensure that the edges of the elements are all aligned; any misalignment can be corrected by applying localised pressure as required. When the desired surface contour has been obtained, the bolster elements 34, 36, 38 and 40 may be removed, preferably one at a time, after being replaced by simpler and relatively inexpensive and lighter weight bolster elements, for example bolster elements of a similar design but without teeth having the specific design features described in FIGS. 4 and 5.

As can be seen from FIG. 6, array elements 624 are arranged in an array and are held in place by four bolsters 634; 636; 638 and 640. The elements 624 and bolster 634, 636, 638 and 640 are orientated at −45° and +45° and the plan of the array is substantially diamond shaped.

Alternative arrangements of array elements are shown in FIGS. 7 to 12; in each of these alternative arrays, at least part of the periphery of the array and bolster is curvilinear. The array elements 724; 824; 924; 1024; 1124 or 1224 are arranged in an array which is secured by a bolster in the form of a flexible restraining strap 734; 834; 934; 1034; 1134 or 1234.

As is shown in FIGS. 8 to 12, at least some of the array elements 824; 924; 1024; 1124 and 1224 respectively positioned on the periphery of the array have one or more adjacent side faces profiled as shown at 810; 910 or 1010 by way of example to conform to the profile adopted by the securing strap 834; 934; 1034; 1134 or 1234 when the strap is tightened and to direct the clamp force of the securing strap 834; 934; 1034; 1134 or 1234.

Alternative arrangements for moving the bolster elements in and out of engagement with the array elements are shown in FIGS. 13 and 14. In FIG. 13, a bolster element 1334 is shown mounted on a horizontal pivot axis 1320. The bolster element 1334 can be pivoted in and out of engagement with the adjacent array element 1324, to allow for adjustment of this element. In FIG. 14, a bolster element 1434 mounted on a slide 1420 is shown in a first engagement position 1434*a* and a second disengagement position 1434*b*. The bolster element 1434 can be slid between the two positions as required.

In the tooling system shown in FIG. 15, tie bars 1520 and cross rails 1522 are shown bolted to the bolster elements 1534 and 1538. The tie bars may be arranged diagonally to the bolsters as shown in FIG. 16 or horizontally in as shown in FIG. 17.

The arrangement of hoop straps 1820 threaded between the support bars of the array elements 1824 shown in FIG. 18 provides a further alternative arrangement for stabilising and strengthening the array. The hoop strap arrangement may be used alone or in combination with the alternate bolster or tie bars of FIGS. 15 to 17.

As can be seen from FIG. 19, an assembly 1910 comprises a plurality of array elements 1924 secured by bolster elements 1934 and 1938. The bolster elements 1934, 1938 are tied together by cross rails 1922 and/or tie bars or hoops bolted through the bolster elements, so that the assembly can be lifted from the chassis as shown in FIG. 20.

FIGS. 21(*a*); 21(*b*) and 21(*c*) show the sequence of steps which can be carried out to correct misalignment of array elements 2124. As is shown in FIG. 21(*a*), a row of array elements 2124 including misaligned elements is, in a first step, moved away from engagement with the correctly aligned array elements 2124*a* or bolster 2134. As the row of misaligned elements is moved back into engagement with the correctly aligned elements 2124*a* or bolster 2134 as shown in FIG. 21(*b*), they are vibrated and as they engage with the correctly aligned elements as shown in FIG. 21(*c*), the misalignment is corrected.

In the embodiment shown in FIG. 22, the elements 2224 are arranged in an array, as shown in FIG. 22 and are held in place by four bolsters 2234, 2236, 2238 and 2240. The elements 2224 are orientated at −45° and +45°. Each of the four bolsters 2234, 2236, 2238 and 2240 is a separate component and comprises a segment of a circle, subtending one quarter of the circumference of the circle. Fasteners 2242 are provided to secure the bolsters to the cross rails 2222, Guide rails 2244 are located in sliding engagement with adjacent bolster components 2234, 2236 and 2238, 2240.

The sequence of operation of the embodiment of FIG. 22 is shown in FIGS. 23 to 25. In the first open configuration, shown in FIG. 23, a first cross rail 2222 supporting bolsters 2234, 2236 is moved away from the array, guided by the guide rail 2244. In the second open configuration, shown in FIG. 24, a second cross rail 2222 adjacent to the first cross rail 2222 and supporting a first element 2224 has been moved in a similar manner back into contact with the first guide rail. Similarly, in the third open configuration shown in FIG. 25, further cross rails 2222 supporting rows of elements 2224. have been moved away from the array, guided by the guide rail 2244. After the desired adjustment of the elements 2224, the sequence is repeated in reverse order until the closed configuration of FIG. 22 is regained.

One of the four bolsters 2234 is shown in FIG. 26. As can be seen from FIG. 26, the bolster 2234 has an element contacting face 2602 on which are mounted a plurality of contact plates 2604. A circumferential groove 2606 is provided on the external curved surface of the bolster 2234.

In the alternative embodiment shown in FIG. 27 the array is similar to that of FIG. 22, but the bolster components 2734, 2736, 2738 and 2740 are substantially rectangular in shape so that the assembled array is substantially square.

The invention claimed is:

1. A tooling system which comprises a plurality of rectangular tool elements arranged in an array to form perpendicular rows and columns of tool elements to define a tool surface, the elements of the array being movable between a closed position in which the elements contact one another and are secured in position, and an open position in which the elements of the array are spaced apart and are capable of vertical movement relative to one another, wherein the tooling system further comprises at least one bolster means provided to hold the elements of the array securely in the closed position, each bolster means having a plurality of element contacting faces, each element contacting face being configured selectively to apply localized pressure to one or more tool elements of the array to adjust an orientation of the tool elements, aligning edges of the tool elements, so as to correct any inter-row or inter-array misalignment, and causing vertices of four adjacent elements to touch one another in the closed position so that the tool elements of the array tessellate.

2. A tooling system according to claim 1 wherein the array is substantially rectangular in plan view amid bolster means are provided on at least two adjacent sides of the rectangular array.

3. A tooling system according to claim 2 wherein bolster means are provided on all four sides of the rectangular array.

4. A tooling system according to claim 3 wherein the outer edges of the rectangular array comprise a plurality of serrations and wherein each element contacting face of the bolster means corresponding to a serration of the plurality of serrations.

5. A tooling system according to claim 4 wherein the plurality of element contacting faces of the bolster means contacting the array are formed from a plurality of teeth, at least some of which teeth are independently adjustable in order to apply localised pressure selectively to one or more elements of the array, in line with the sides of the elements.

6. A tooling system according to claim 5 wherein the teeth are also individually adjustable in height relative to one another.

7. A tooling system according to claim 1 wherein the bolster means comprise two sets of bolsters, the first of which is used during machining of the elements of the tooling system and the second of which is used when the elements of the array have been machined amid the system is being used as a mould.

8. A tooling system according to claim 1 wherein at least one of the bolster means is formed of two or more separate component sections, so that one or more component sections maybe removed to allow opening and adjustment of a part of the array, while maintaining the remainder of the array secured in the closed position.

9. A tooling system according to claim 1 wherein the bolster means are modular in design, so that individual bolster sides interlock with one another to form larger units.

10. A tooling system according to claim 1 wherein it further comprises vibrating means, so that the bolster sides can be vibrated to assist in bedding down the elements of the array.

11. A tooling system according to claim 1 wherein it further comprises sensors to detect and measure the forces applied to the elements of the array and/or to detect any movement.

12. A tooling system according to claim 1 wherein it further comprises means for securing the bolster means in position around the array of elements.

13. A tooling system according to claim 4 wherein the bolster means comprises four identical bolster components each of which is mounted on a cross rail of the array and guided by a guide rail with which it is in sliding engagement.

14. A tooling system according to claim 13 wherein the bolster means is substantially circular or substantially rectangular.

15. A tooling system according to claim 1 wherein the faces of the bolster means which contact the elements of the array are provided with contact pads.

16. A tooling system according to claim 2, wherein outer edges of the rectangular array comprise a plurality of serrations, each element contacting face of the bolster means corresponding to a serration of the array and arranged such fiat element contacting faces on adjacent bolster means are configured to selectively apply localized pressure to tool elements at both ends of a line or column of the array.

* * * * *